(12) United States Patent
Thind et al.

(10) Patent No.: US 7,653,642 B2
(45) Date of Patent: Jan. 26, 2010

(54) AUTO QUOTA

(75) Inventors: Ravinder S. Thind, Kirkland, WA (US);
Neal R. Christiansen, Bellevue, WA (US); Ran Kalach, Bellevue, WA (US);
James R. Benton, Seattle, WA (US);
Rajeev Y. Nagar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 343 days.

(21) Appl. No.: 11/000,294

(22) Filed: Nov. 30, 2004

(65) Prior Publication Data

US 2006/0117070 A1   Jun. 1, 2006

(51) Int. Cl.
*G06F 7/00* (2006.01)
*G06F 12/00* (2006.01)

(52) U.S. Cl. ...................... 707/101; 707/205
(58) Field of Classification Search .............. 707/3, 707/200; 395/602

See application file for complete search history.

(56) References Cited

U.S. PATENT DOCUMENTS

| 5,408,619 | A | * | 4/1995 | Oran ...................... 707/10 |
| 5,713,013 | A | * | 1/1998 | Black ...................... 707/2 |
| 6,038,665 | A | * | 3/2000 | Bolt et al. ............... 713/176 |
| 6,799,206 | B1 | * | 9/2004 | Workman et al. ......... 709/223 |
| 6,950,818 | B2 | * | 9/2005 | Dennis et al. ............. 707/3 |

* cited by examiner

*Primary Examiner*—Tony Mahmoudi
*Assistant Examiner*—Paul Kim
(74) *Attorney, Agent, or Firm*—Merchant & Gould PC

(57) ABSTRACT

Method and system for establishing and maintaining quotas. An auto quota is defined and applied to a directory. Input and output is monitored to detect a successful operation that involves a subdirectory of the directory. A determination is made as to whether to apply a quota associated with the auto quota to the subdirectory. If the determination is that the quota is to be applied to the subdirectory, it is automatically applied.

17 Claims, 10 Drawing Sheets

AUTO QUOTA

FIELD OF THE INVENTION

The invention relates generally to computers, and more particularly to file systems.

BACKGROUND

Disk capacity continues to increase at phenomenal rates. At the same time, however, managing the disk space, especially for disks that may be used by more than one user, is becoming more troublesome. Even though disk capacity has increased greatly, it is still finite and may be consumed prematurely or by a small number of users if mismanaged. Thus, administrators or the like are left with the task of determining how much disk space each user should be allowed to consume and what to do if a user attempts to exceed the user's disk space.

What is needed is a method and system that assists administrators or the like in establishing and maintaining quotas on storage usage. Ideally, the method and system would address newly added or moved user accounts in addition to establishing and maintaining quotas for other types of storage usage.

Briefly, the present invention provides a method and system for establishing and maintaining quotas. An auto quota is defined and applied to a directory. Input and output is monitored to detect a successful operation that involves a subdirectory of the directory. A determination is made as to whether to apply a quota associated with the auto quota to the subdirectory. If the determination is that the quota is to be applied to the subdirectory, it is automatically applied.

In one aspect of the invention, the operations monitored are creates and renames. A rename may involve changing the name of the subdirectory, moving the subdirectory into the directory, or both changing the name of the subdirectory and moving the subdirectory into the directory.

In another aspect of the invention, determining whether a quota is applied to the subdirectory comprises determining whether another quota is already applied to the subdirectory, and if so, not applying the quota to the subdirectory.

In another aspect of the invention, determining whether a quota is applied to the subdirectory comprises determining whether the name of the subdirectory is included in an exclude list, and if so, not applying the quota to the subdirectory.

In one aspect of the invention, a filter monitors the inputs and outputs to a file system. The filter may execute in user mode or in kernel mode. The filter may communicate with another process in applying quotas to subdirectories of the directory.

Other aspects will become apparent from the following detailed description when taken in conjunction with the drawings, in which:

DETAILED DESCRIPTION

Exemplary Operating Environment

Figure 1:
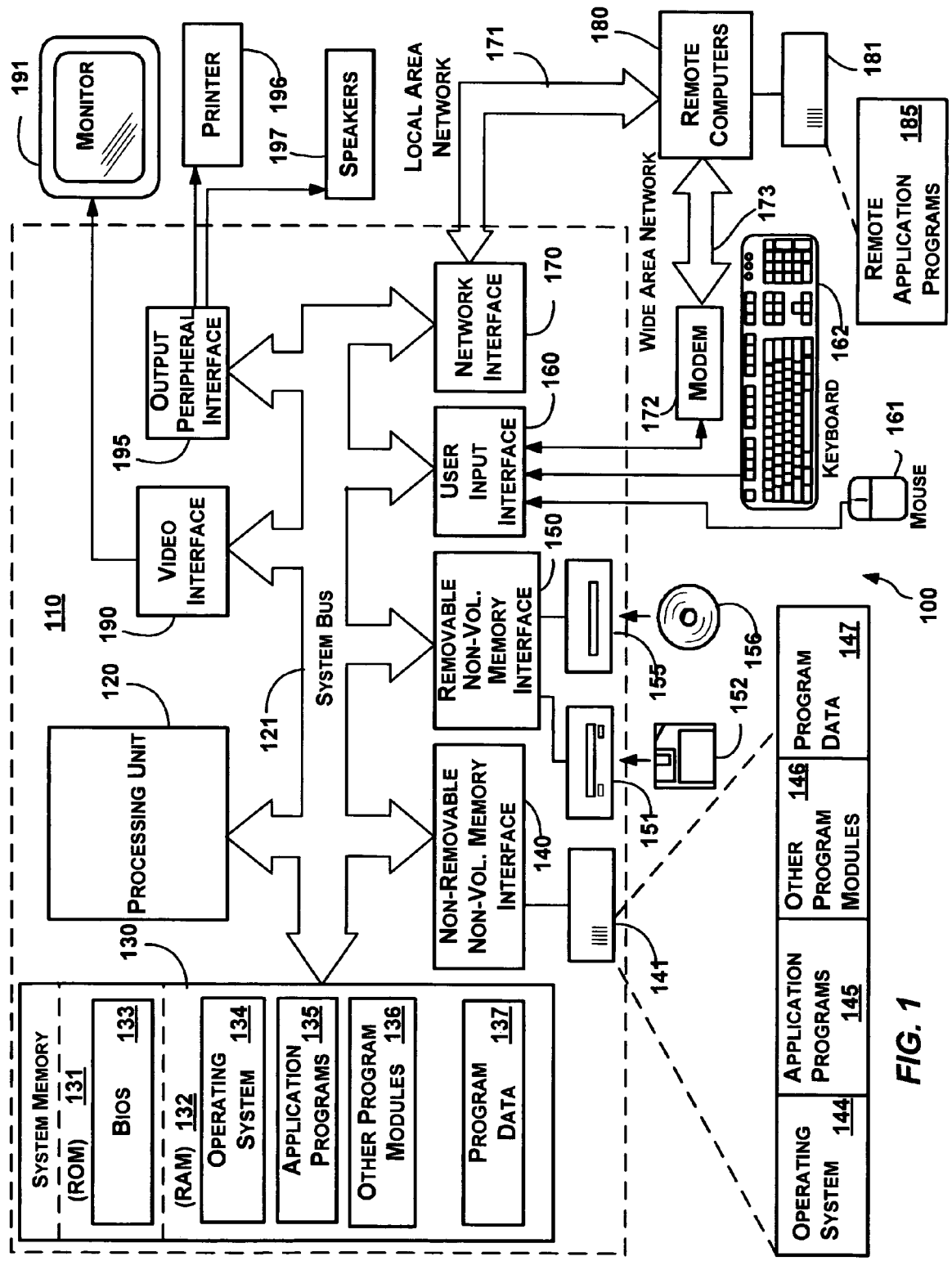
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Filters and Arrangements Thereof

With contemporary operating systems, such as Microsoft Corporation's Windows® XP operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver. In general, filter drivers (sometimes referred to herein simply as "filters") are processes or components that enhance the underlying file system by performing various file-related computing tasks that users desire, including tasks such as passing file system I/O (requests and data) through anti-virus software, file system quota providers, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

Figure 2:
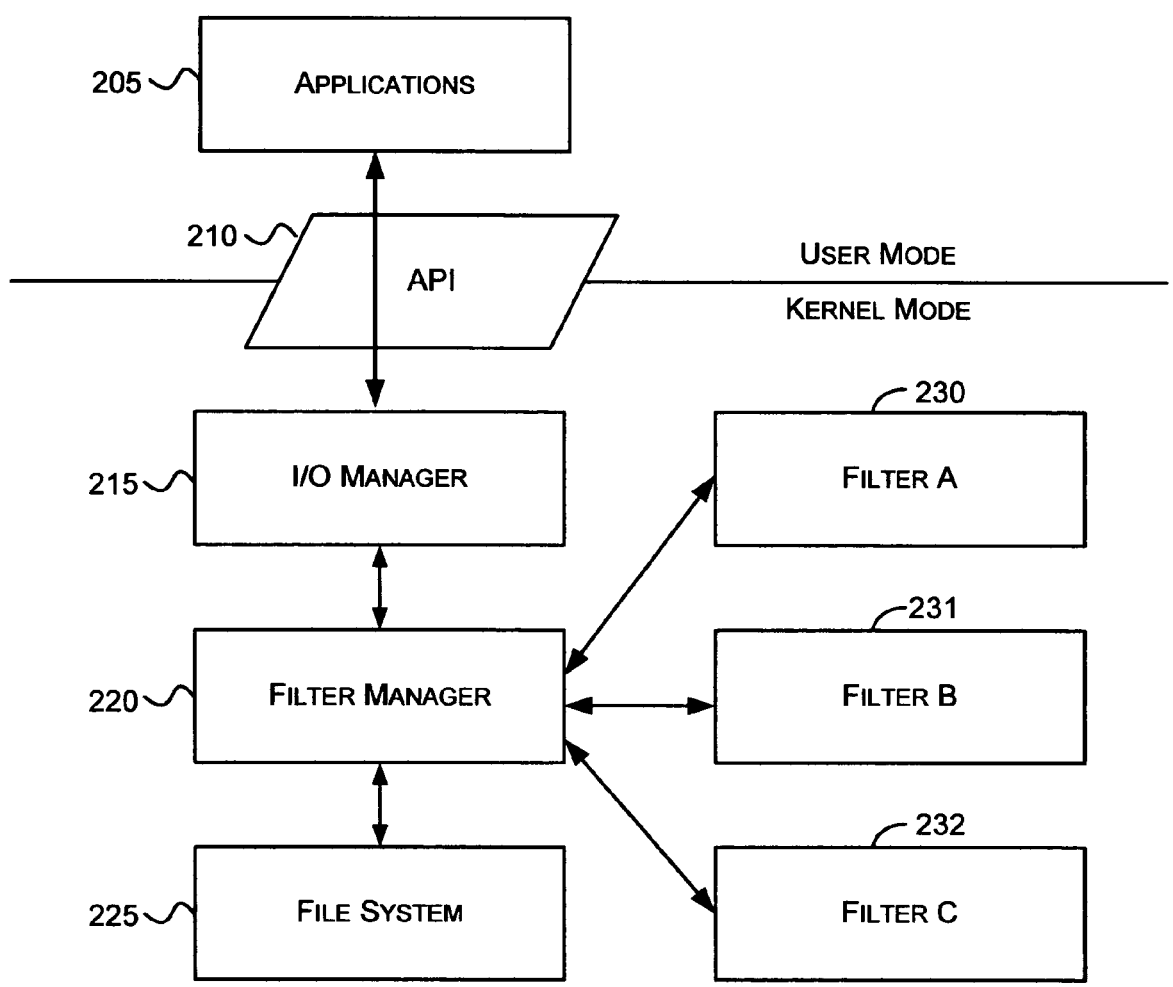
FIG. 2 is a block diagram representing an exemplary arrangement of components of a system in which the present invention may operate in accordance with various aspects of the invention.

FIG. 2 is a block diagram representing an exemplary arrangement of components of a system in which the present invention may operate in accordance with various aspects of the invention. The components include one or more applications 205, an applications programming interface (API) 210, an input/output (I/O) manager 215, a filter manger 220, a file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 210 may also return data to the applications 205 as operations associated with the file system requests proceed, complete, or abort.

In one implementation, filters comprise objects or the like that when instantiated register (e.g., during their initialization procedure) with a registration mechanism in the filter manager 220. For efficiency, each filter typically will only register for file system requests in which it may be interested in processing. To this end, as part of registration, each filter notifies the filter manager 220 of the types of I/O requests in which it is interested (e.g., create, read, write, close, rename, and so forth). For example, an encryption filter may register for read and write I/Os, but not for others wherein data does not need to be encrypted or decrypted. Similarly, a quota filter may be interested only in object creates and object writes.

In addition to specifying the types of I/O requests in which it is interested, a filter may further specify whether the filter should be notified for pre-callbacks and post callbacks for each of the types of I/O. A pre-callback is called as data associated with an I/O request propagates from the I/O manager 215 towards the file system 225, while a post-callback is called during the completion of the I/O request as data associated with the I/O request propagates from the file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data to each filter that has registered to receive callbacks for the type of I/O received by the filter manager 220. Any filters registered to receive callbacks for the type of I/Os received by the filter manager are sometimes referred to as registered filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
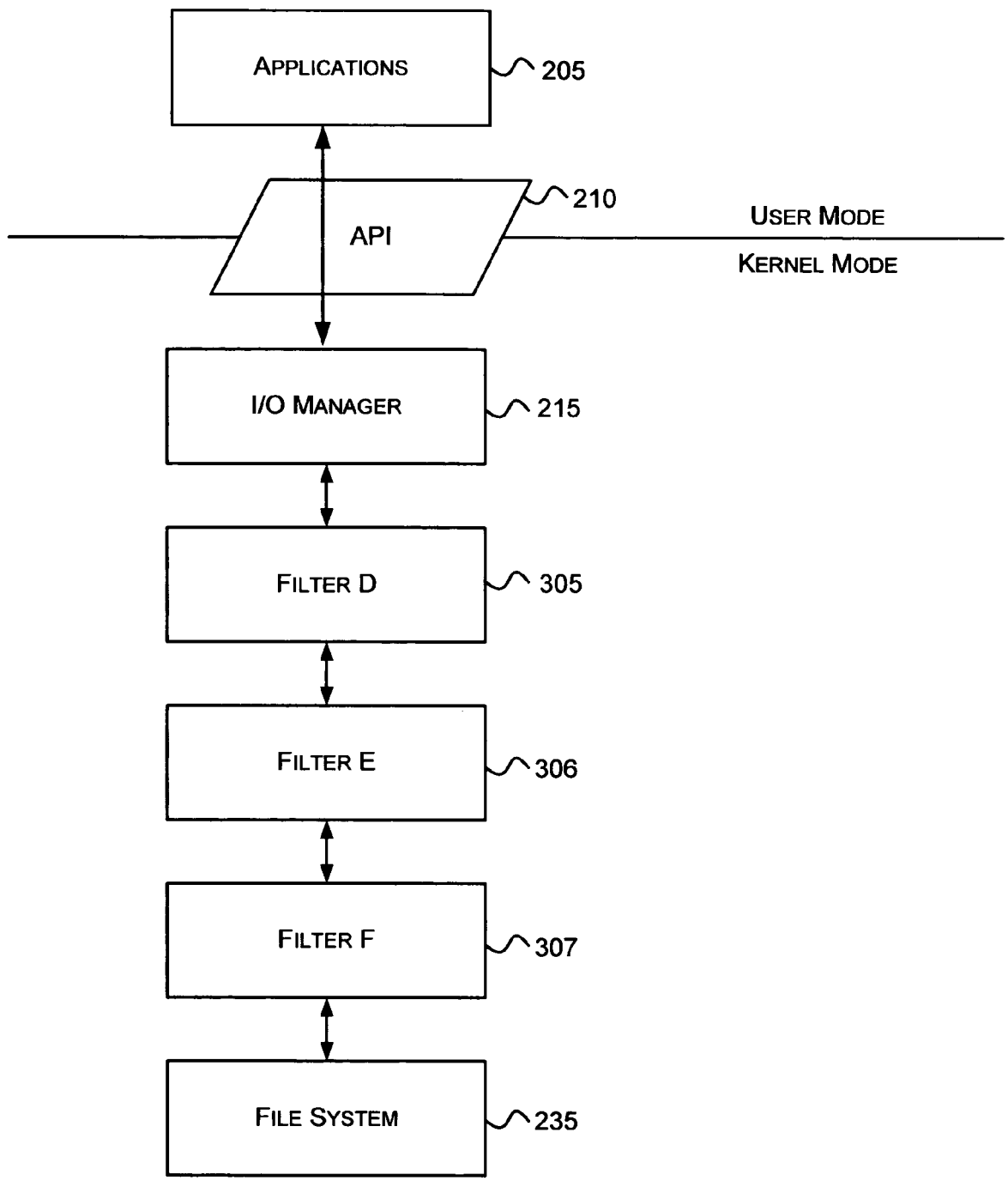
FIG. 3 is a block diagram representing another exemplary arrangement of components of a system in which the present invention may operate in accordance with various aspects of the invention.

In one embodiment, filters may be arranged in a stacked manner as illustrated in FIG. 3, which is a block diagram representing another exemplary arrangement of components of a system in which the present invention may operate in accordance with various aspects of the invention. In this embodiment, each of the filters 305-307 may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the file system 235.

After the file system 235 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
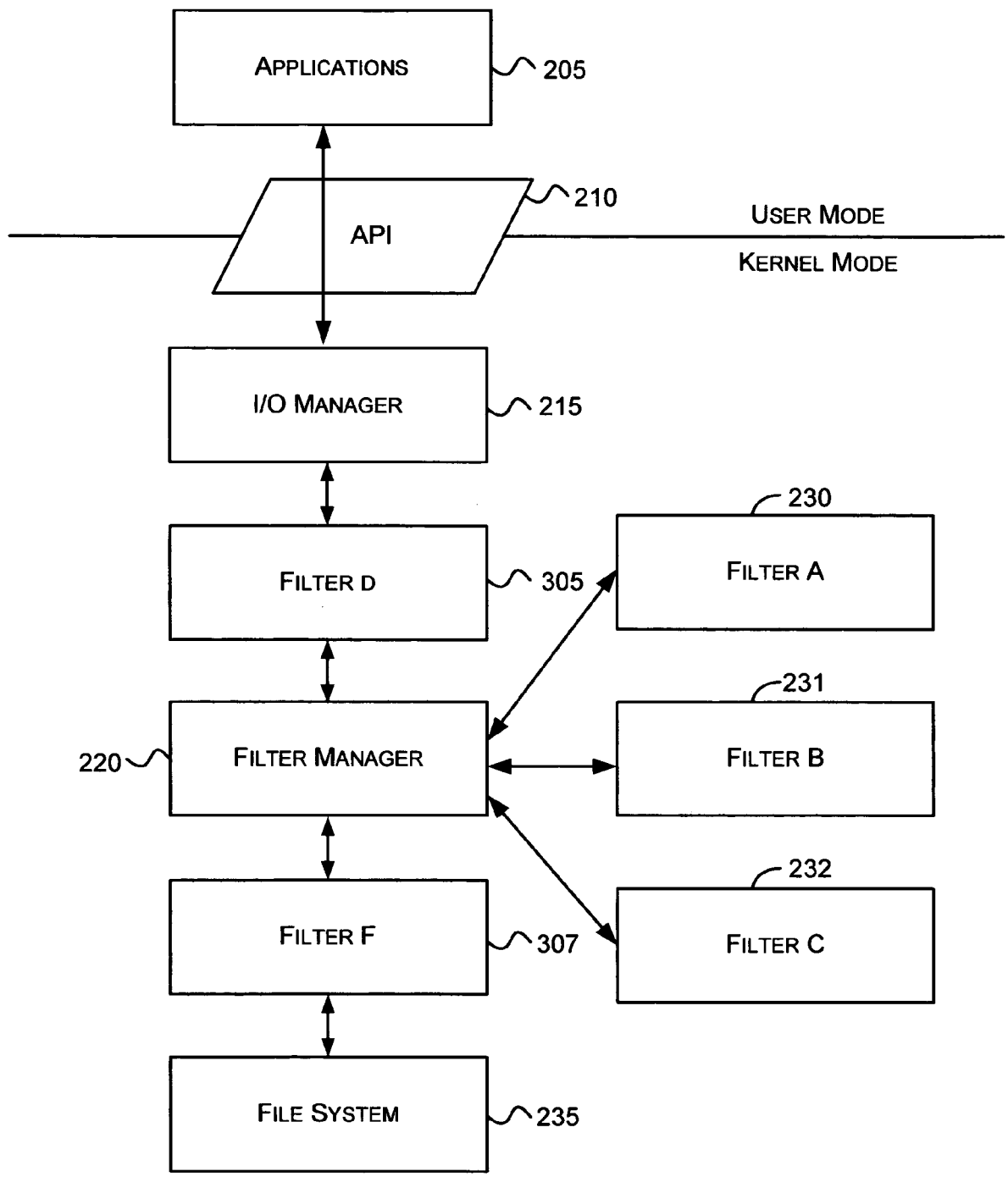
FIG. 4 is a block diagram representing another exemplary arrangement of components of a system in which the present invention may operate in accordance with various aspects of the invention.

In another embodiment of the invention, filters may be arranged in a stacked/managed manner as illustrated in FIG. 4, which is a block diagram representing another exemplary arrangement of components of a system in which the present invention may operate in accordance with various aspects of the invention. In this configuration, some of filters are associated with a filter manager while other filters are not. The filter manager 220 is placed in a stack with other filters (e.g., filters 305 and 307).

It will be readily recognized that filters may be implemented in many other configurations without departing from the spirit or scope of the invention. In some embodiments, a filter comprises any object that examines I/O between an application and a file system and that is capable of changing, completing, or aborting the I/O or performing other actions based thereon. Such filters may execute in user mode or in kernel mode and may be part of other components.

Returning to FIG. 2, the file system 235 may include one or more volumes that may be located locally or remotely to the machine or machines upon which the applications 205 execute.

Auto Quotas

Figure 5:
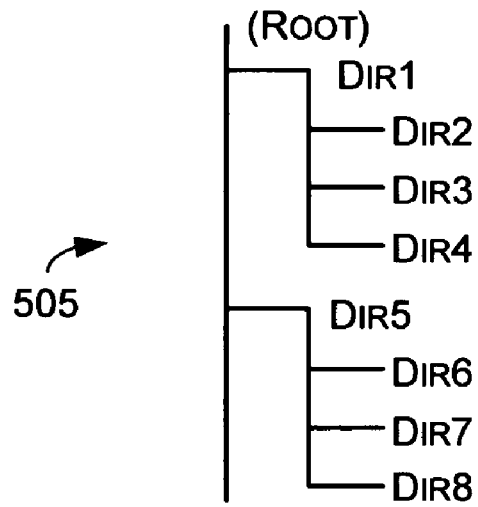
FIG. 5 is a diagram generally representing a portion of a directory structure of an exemplary file system with which the present invention may be practiced in accordance with various aspects of the invention.

FIG. 5 is a diagram generally representing a portion of a directory structure of an exemplary file system with which the present invention may be practiced in accordance with various aspects of the invention. The directory structure 505 includes a root directory which has subdirectories Dir1 and Dir5. The directory Dir1 has subdirectories Dir2, Dir3, and Dir4 while the directory Dir5 has subdirectories Dir6, Dir7, and Dir8.

An administrator or the like may desire to impose a quota on each directory that is a direct subdirectory of a particular directory. A quota may include, among other things, an amount of disk space permitted to be consumed by all files or directories that are descendants of a given directory. A descendant of a directory includes any subdirectories and files in the directory, subdirectories and files in those subdirectories, and so forth. A direct subdirectory of a directory is a subdirectory that is contained in the directory itself as compared to any descendant directory thereof.

Referring to FIG. 5, the administrator, for example, may set a quota on Dir1 of one megabyte. This means that the combined amount of space used by all descendant files and directories of Dir1 should not exceed one megabyte. For example if the files (not shown) in Dir2 consumed 500 kilobytes of space, the files (not shown) in Dir3 consumed 125 kilobytes of space, the files (not shown) in Dir4 consumed 125 kilobytes of space, and the overhead space to maintain the directories Dir1, Dir2, Dir3, and Dir4 consumed 4 kilobytes of space, the total remaining space before the quota is exceeded is 246 kilobytes.

Figure 6:
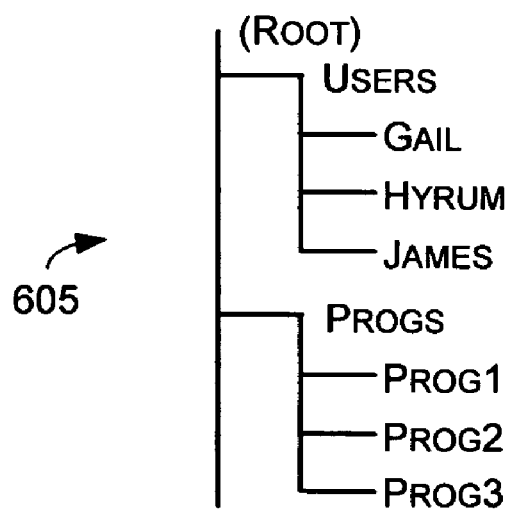
FIG. 6 is a diagram generally representing a portion of a directory structure of an exemplary file system with which the present invention may be practiced in accordance with various aspects of the invention.

An administrator may wish to apply a quota on directories associated with user accounts. The administrator may cause user accounts to be created in a \Users directory of a directory structure 605 of FIG. 6, which is a diagram generally representing a portion of a directory structure of an exemplary file system with which the present invention may be practiced in accordance with various aspects of the invention. To impose a default quota on each subdirectory that is created or moved to the \Users directory, the administrator may apply an auto quota on the \Users directory as described in more detail below.

Briefly, each time a subdirectory is created in a directory with an auto quota applied on the directory, the quota definition included in or associated with the auto quota is applied to the subdirectory. An auto quota may include any of the elements of a normal quota definition together with an exclude list. In one sense, an auto quota may be viewed as including (or being associated with) a quota definition and an exclude list. Sometimes, applying the quota definition included in or associated with the auto quota to a subdirectory (e.g., to create a quota on the subdirectory) is referred to as applying the quota of the auto quota to the subdirectory. In addition, although sometimes herein the quota of the auto quota is referred to as being in the auto quota, in other embodiments, the quota may be in another data structure associated with the auto quota.

A quota definition typically includes quota attributes and actions. Some exemplary quota attributes of a quota include size, directory name, thresholds, a high water mark that maintains the highest quota value charged, a high water time that indicates that last time the high water mark was updated, a last configuration time that indicates when the quota attributes were last modified, a quota tag that comprises a user-defined string that is associated with the quota, and the like. It will be recognized, however, that fewer, more, or other quota attributes may be included in a quota without departing from the spirit or scope of the present invention.

In one implementation, a subdirectory that is renamed in or into (hereinafter "renamed in") an auto quota directory and that already has a quota applied to it keeps its existing quota and does not have the quota included in the auto quota applied to it. In another implementation, however, such a directory has the quota applied to it. A subdirectory that does not have a quota and that is renamed in the directory has the quota of the auto quota applied to it.

In some operating systems, a rename operation may change the name of directory and/or move the directory. In other operating systems, there may be separate operations for renaming and moving a directory. An auto quota may be applied in either type of operating system by causing a filter to monitor the appropriate operations (e.g., rename or move and change name). As used herein, renaming a directory may comprise moving and/or changing the name of a directory.

An auto quota may include an exclude list that indicates certain subdirectory names that are not subject to having the quota of the auto quota applied to them. In one embodiment, each subdirectory name will match one subdirectory. In another embodiment, wild card characters may be used in one or more entries of the exclude list to match a pattern of subdirectories that may be created. An exclude list may have a default entry (e.g., such as a recycle bin directory) that is present upon creation of the auto quota until deleted by an administrator or the like. When a subdirectory is created or renamed in the directory, if the subdirectory has a name that is included in or matches an entry in the exclude list, the quota of the auto quota is not applied to the subdirectory.

When an auto quota is initially applied to a directory, the subdirectories of the directory may be enumerated and have the quota of the auto quota applied to them. Subdirectories with names included in the exclude list or that already have quotas applied to them, however, may not have the quota applied. In another implementation, subdirectories that already have quotas applied to them will have the quota of the auto quota applied to them such that the previous quotas no longer apply.

An auto quota may be applied to any directory of a file system. Furthermore, an auto quota may be applied to one directory and another auto quota applied to a descendant directory of the directory. Although not usual, there may be a different auto quota applied to each directory of a file system.

It will be recognized that the aspects above may allow an administrator or the like to readily apply an auto quota on a directory to establish and maintain quotas for subdirectories for new or moved users.

Figure 7:
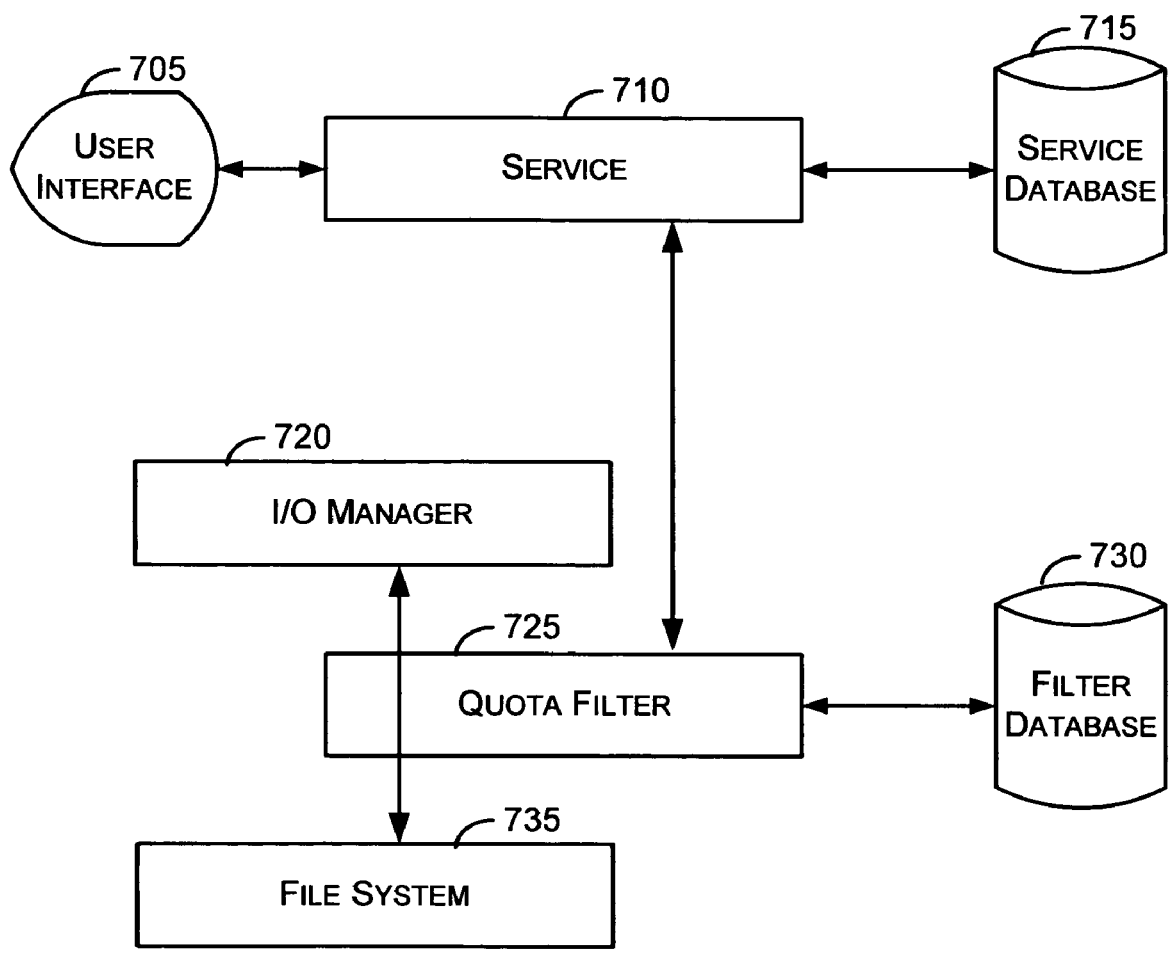
FIG. 7 is a block diagram representing another exemplary arrangement of components of a system in which the present invention may operate in accordance with various aspects of the invention.

FIG. 7 is a block diagram representing another exemplary arrangement of components of a system in which the present invention may operate in accordance with various aspects of the invention. The components may include a user interface 705, a service 710, a service database 715, an I/O manager 720, a quota filter 725, a filter database 730, and a file system 735.

An administrator or the like may use the user interface 705 to interact with the service 710 to, add, delete, query, and configure auto quotas on one or more directories of the file system 735. During configuration, the administrator may perform various actions related to auto quotas including adding, deleting, enumerating, modifying, and the like. The auto quotas may be persisted in a service database 715 that may be read when the service 710 initializes.

The filter database 730 may include data that identifies auto quota directories including the directory names and a GUID associated with each directory name. This data may be stored so that each time a subdirectory is created or renamed in an auto quota directory, the quota filter may recognize that a notification should be sent to the service 710. The notification may identify the auto quota by passing the GUID to the service 710. In implementations where the quota filter 725 also enforces quotas, the filter database 730 may also include quota attributes of quotas enforced on directories of the file system 735.

Actions associated with a quota may be stored in the service database 715. Actions defined by a quota definition may include running a program and any actions associated therewith, sending a message to a console, sending e-mail, logging events in a system event log, generating a report, and the like. Typically actions are triggered by I/O requests that would or do cause the amount of space consumed by a directory and its descendants to cross a threshold or exceed the size of the quota. It will be recognized that other actions may be included in or associated with a quota without departing from the spirit or scope of the present invention.

After an auto quota for a directory is configured via the service 710, the service 710 informs the quota filter 725 to monitor the directory whose name is included in the auto quota and to notify the service 710 when any subdirectory is renamed into or created in the directory. Because the quota filter 725 may examine any I/O that travels between an application (not shown) and the file system 735, the quota filter may determine when a subdirectory is created or renamed in any directory on which an auto quota is applied. When such a subdirectory is successfully created or renamed in an auto quota directory, the quota filter informs the service 710 of the subdirectory.

If the service 710 determines that the subdirectory name is not included in an exclude list and that the subdirectory does not already have a quota applied to it, the service 710 may then instruct the quota filter 725 to apply the quota of the auto quota associated with the directory.

In one embodiment, the functionality of the service 710 resides in the quota filter 725. In this embodiment, the service database 715 and the filter database 730 may be combined. Furthermore, the quota filter 725 may itself apply the quota of the auto quota when appropriate.

In another embodiment, the service 710 may apply quotas related to auto quotas without notification from the quota filter 725. For example, the service 710 may register with a directory notification component of an operating system to receive notification anytime changes are made to auto quota directories. When a change is made to one of the directories and a notification sent to the service, the service may determine whether a direct subdirectory was created or renamed in one of the directories and apply quota of an auto quota associated with the directory as appropriate. In this embodiment, the service 710 may use a quota filter 725 to enforce quotas even though the service 710 does not use the quota filter to assist the service 710 by notifying the service 710 when subdirectories are created or renamed in an auto quota directory.

In yet another embodiment of the invention, some or all of the auto quota functionality of the quota filter 725 and/or the service 710 are embedded in the file system 735. When the file system notices that a direct subdirectory is created or renamed in an auto quota directory, the file system may inform the service 710 which may then apply the quota of the auto quota to the new directory. Alternatively, the file system may itself apply quota to the subdirectory.

Figure 8:
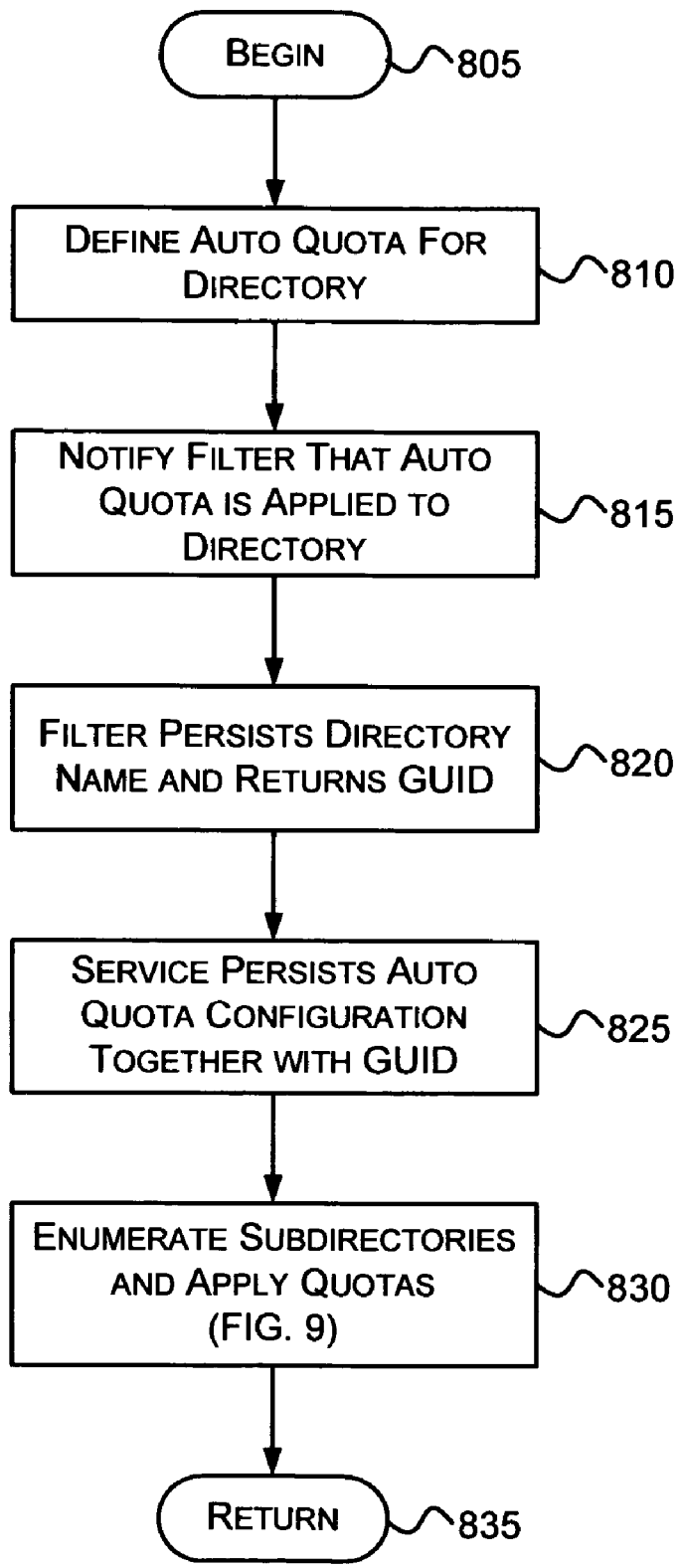
FIG. 8 is a flow diagram that generally represents actions that may occur when defining an auto quota in accordance with various aspects of the invention.

FIG. 8 is a flow diagram that generally represents actions that may occur when defining an auto quota in accordance with various aspects of the invention. The process begins at block 805. At block 810, an administrator, administrative program, or the like defines an auto quota for a directory. For example, referring to FIG. 7, an administrator may interact with the user interface 705 to define auto quotas. The user interface 705 may interact with a program such as a quota service to define the auto quota.

At block 815, the filter is notified to apply an auto quota to a directory. The filter then begins monitoring subdirectory renames or creates that occur in that directory. If a subdirectory is created or renamed in an auto quota directory, the filter notifies the quota service of the subdirectory.

At block 820, the filter creates a globally unique identifier (GUID) for the recently received auto quota directory, persists (e.g., stores in a database) the directory name together with the GUID, and returns the GUID to the service.

At block 825, the service persists the auto quota configuration and associates it with the GUID. At block 830, the subdirectories of the recently created auto quota directory are enumerated and quotas applied as described in more detail in conjunction with FIG. 9. At block 835, the process ends.

Figure 9:
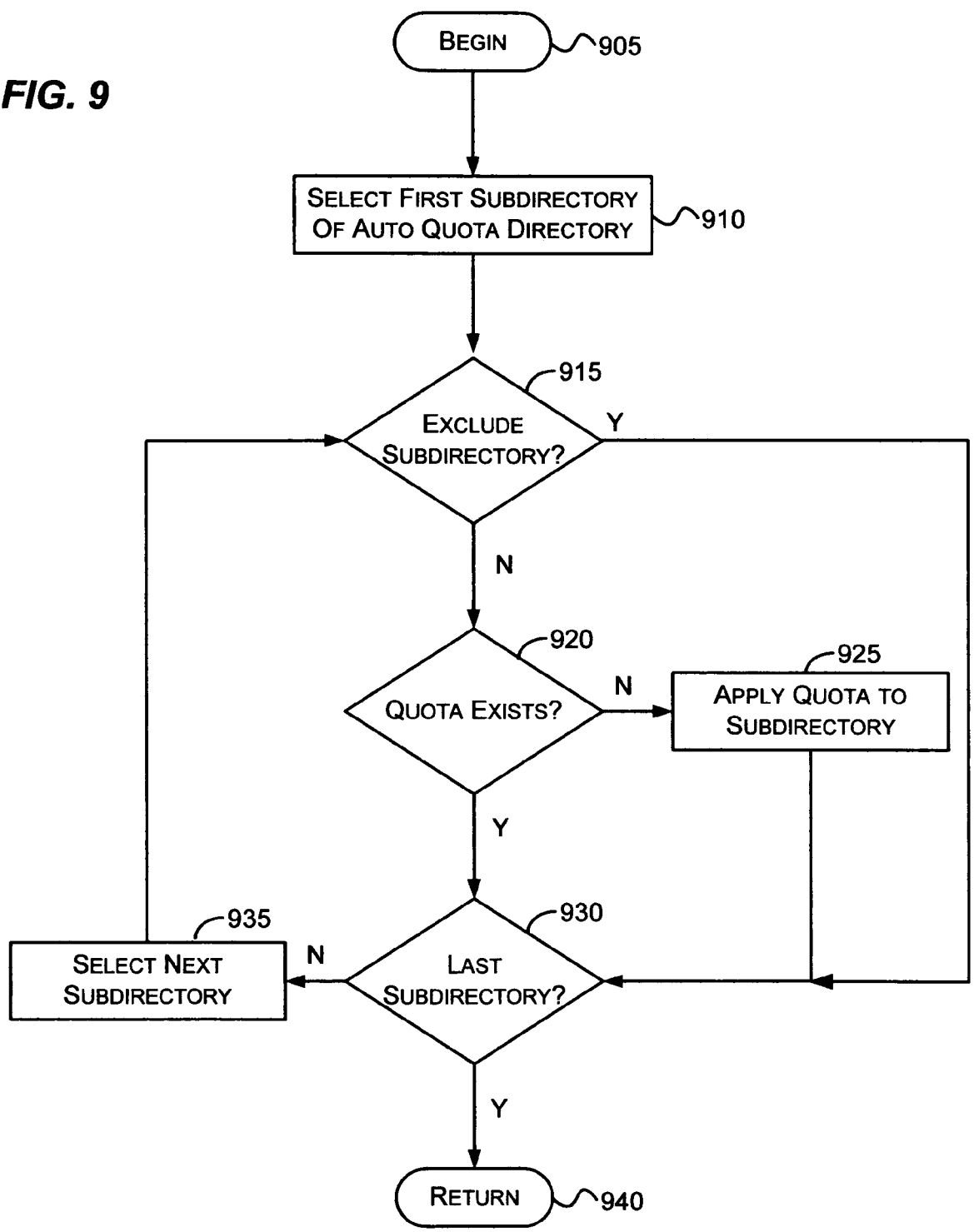
FIG. 9 is a flow diagram that generally represents actions which correspond to block 830 of FIG. 8 that may occur when enumerating subdirectories of a directory for a recently created auto quota in accordance with various aspects of the invention.

FIG. 9 is a flow diagram that generally represents actions which correspond to block 830 of FIG. 8 that may occur when enumerating subdirectories of a directory for a recently created auto quota in accordance with various aspects of the invention. The process begins at block 905.

At block 905, the first subdirectory of the directory is selected. At block 915, a determination is made as to whether the currently selected subdirectory is a directory that is in an exclude list. If so, processing branches to block 930; otherwise, processing branches to block 920.

At block 920, a determination is made as to whether a quota already exists (e.g., has already been applied) for the selected subdirectory. If so, processing branches to block 930; otherwise, processing branches to block 925. In one embodiment, if a quota already exists for a subdirectory of an auto quota, the quota included in the auto quota is not applied to the subdirectory. In another embodiment, even if a quota already exists for a subdirectory of a recently created auto quota, the quota included in the auto quota is applied to the subdirectory and the old quota no longer applies to the subdirectory. In this embodiment, block 915 may branch to block 925 and the actions associated with block 920 may not be performed.

At block 925, the quota included in the auto quota is applied to the subdirectory. At block 930, a determination is made as to whether the selected directory is the last directory of the auto quota directory. If so, processing branches to block 940; otherwise, processing branches to block 935.

At block 935, the next subdirectory of the auto quota directory is selected and processing continues at block 915. The actions associated with block 915-935 may repeat until all subdirectories in an auto quota directory have been enumerated.

At block 940, the process returns.

Figure 10:
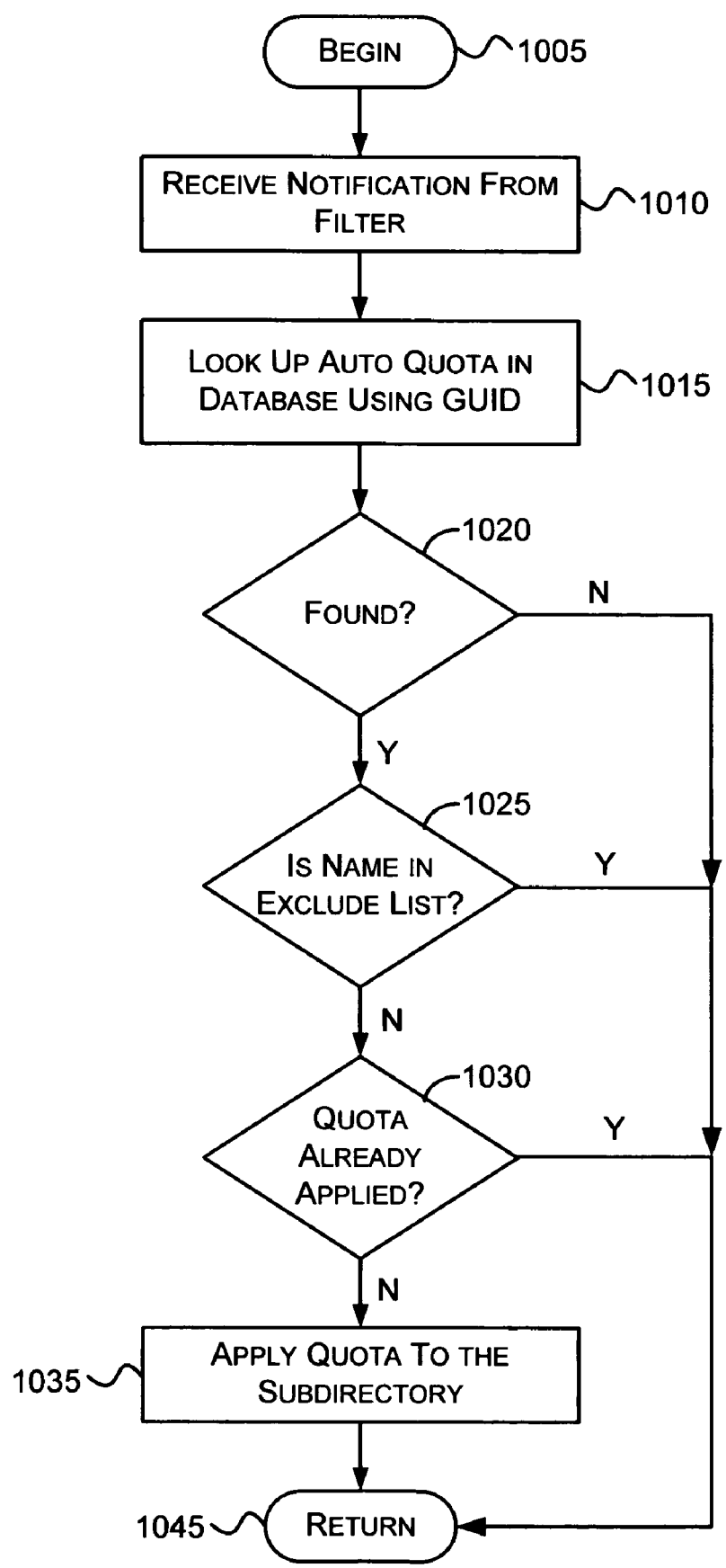
FIG. 10 is a flow diagram that generally represents actions that may occur when a subdirectory is created or renamed in an auto quota directory in accordance with various aspects of the invention.

FIG. 10 is a flow diagram that generally represents actions that may occur when a subdirectory is created or renamed in an auto quota directory in accordance with various aspects of the invention. At block 1005, the process begins.

At block 1010, a notification is received from a filter. The notification indicates that a subdirectory has been created or renamed in an auto quota directory. The notification may or may not distinguish between whether the subdirectory was newly created or resulted from a rename operation. In one embodiment, the notification may indicate that the subdirectory was created in the directory even if the subdirectory was actually renamed in the directory. The notification may include the name of the subdirectory together with a GUID associated with an auto quota associated with a directory in which the subdirectory appeared. A subdirectory appearing in a directory may refer to the subdirectory being created in the directory or the subdirectory being renamed while in the directory and/or moved into the directory.

At block 1015, the service looks up the auto quota using the GUID received. The GUID may not be found in the database (e.g., the auto quota may have been recently deleted or created). At block 1020, a determination is made as to whether the GUID is found in the database. If so, processing branches to block 1025. Otherwise, processing branches to block 1045.

At block 1025, a determination is made as to whether the directory name is included in an exclude list. If so, processing branches to block 1045; otherwise, processing branches to block 1030.

At block 1030, a determination is made as to whether a quota is already applied to the directory. If so, processing branches to block 1045; otherwise, processing branches to block 1045. In one embodiment, if a quota is already applied to the directory, the quota in the auto quota is not applied to the directory. In another embodiment, the actions associated with block 1030 may be omitted and block 1025 may branch directly to block 1035.

At block 1035, the quota included in the auto quota is applied to the subdirectory. When the quota is applied to the subdirectory, the filter may update its database and begin enforcing the quota on the subdirectory. After the quota has been applied to the subdirectory, the quota may be changed by user action or otherwise.

In applying the quota included in an auto quota to a subdirectory, a tag may be created and associated with the subdirectory. The tag may indicate that the quota applied to the subdirectory was created from the auto quota. If the auto quota is changed, any subdirectory having a tag that indicates that its quota was created from the auto quota may have its quota changed to match the quota included in the changed auto quota. In other words, the tag may be used to push modifications to the auto quota configuration to any quota created therefrom.

Furthermore, the tag may be used to identify quotas created by auto quotas (as compared to quotas created by an administrator or the like). This may be helpful for an administrator or the like in determining if a quota was created automatically.

At block 1045, the process returns.

Figure 11:
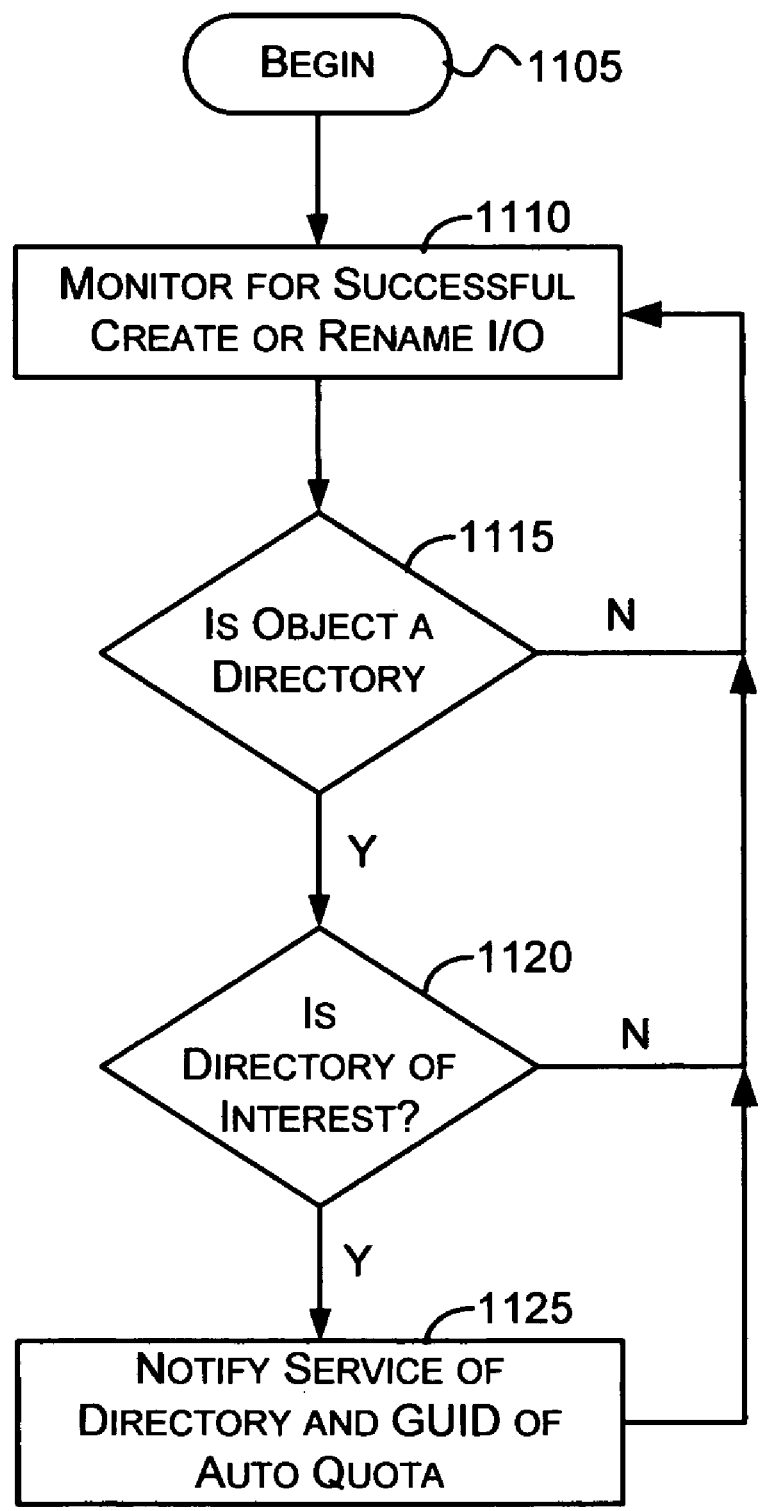
FIG. 11 is a flow diagram that generally represents actions that may occur before a filter provides notification that a subdirectory has been created or renamed in an auto quota directory in accordance with various aspects of the invention.

FIG. 11 is a flow diagram that generally represents actions that may occur before a filter provides notification that a subdirectory has been created or renamed in an auto quota directory in accordance with various aspects of the invention. At block 1105, the process begins.

At block 1110, the filter monitors for a successful subdirectory creation or renaming I/O operation. When such an operation completes successfully, processing continues at block 1115. It will be noted, however, that the filter may also be performing other operations while monitoring for a successful subdirectory creation or renaming. For example, the filter may be enforcing quotas, updating metadata to track changes on the file system, performing other actions, and the like.

At block 1115, a determination is made as to whether the I/O operation involved an object that is a directory. If so, processing branches to block 1120; otherwise, processing branches to block 1110. A create or rename operation may involve the creation or renaming of an object such as a file instead of an object that is a directory. Operations that involve files may not be of interest in applying a quota included in an auto quota to a subdirectory.

At block 1120, a determination is made as to whether the directory is a directory of interest. If so, processing branches to block 1125; otherwise, processing branches to block 1110. A directory is a directory of interest if the directory is a direct subdirectory of an auto quota directory.

At block 1125, the service is notified of the directory name together with a GUID that identifies the auto quota that applies to the directory.

The process described above may continue until the filter is shut down or otherwise terminated.

In some embodiments of the invention, the functionality of the service may be included in the filter. In such embodiments, the filter may not need to provide notification to a service when a directory of interest is created or renamed. Rather, at block 1125, the filter may simply perform the actions described in conjunction with blocks 1025, 1030, 1035, and 1040 of FIG. 10. Furthermore, there may also be no need of other interactions between the filter and a service such as generating and passing a GUID associated with an auto quota as described in conjunction with block 815 of FIG. 8. In addition, the filter may be constructed to interact with a user or process in creating, modifying, and deleting auto quotas.

As can be seen from the foregoing detailed description, there is provided a method and system for establishing and maintaining quotas. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment including a first directory and a second directory different from the first directory, wherein the first directory includes a subdirectory, a method, comprising:

monitoring, by a computing device comprising at least one processing unit and memory, for an operation that associates the subdirectory with the second directory, wherein the second directory is associated with an auto quota, the auto quota including a quota and an exclude list;

determining whether a name of the subdirectory is in the exclude list, the exclude list comprising subdirectory names that are not subject to having the quota associated with the auto quota applied to them;

determining if any other quota has already been applied to the subdirectory, including any quota applied by the first directory; and when the name of the subdirectory is not in the exclude list and no other quota has already been applied, applying the quota included in the auto quota to the subdirectory.

2. The method of claim 1, wherein the operation comprises creating the subdirectory.

3. The method of claim 1, wherein the operation comprises renaming the subdirectory.

4. The method of claim 1, wherein the operation comprises moving the subdirectory into the directory.

5. The method of claim 1, wherein the auto quota comprises a name of the directory and a definition of the quota.

6. The method of claim 5, wherein the definition of the quota comprises a size that the subdirectory together with its descendants is allowed to consume.

7. The method of claim 1, wherein monitoring for a successful operation is performed by a process that is given an opportunity to examine operations between an application and a file system.

8. The method of claim 1, wherein monitoring for a successful operation is performed by a filter.

9. The method of claim 8, wherein the filter executes in kernel mode.

10. The method of claim 1, wherein applying a quota to the subdirectory comprises notifying a process that the operation has completed successfully.

11. The method of claim 10, wherein the process comprises a service that executes in user mode.

12. The method of claim 10, wherein determining whether a name of the subdirectory is in an exclude list is performed by the service.

13. The method of claim 10, wherein applying a quota to the subdirectory further comprises instructing the filter to enforce the quota on the subdirectory.

14. The method of claim 1 further comprising determining if the subdirectory is the last subdirectory.

15. The method of claim 1, wherein monitoring for an operation includes detecting at least one of a copy operation, a rename operation, and a move operation.

16. In a computing environment including a first directory and a second directory different from the first directory, wherein the first directory includes a subdirectory, a method, comprising:

monitoring, by a computing device comprising at least one processing unit and memory, for an operation that associates the subdirectory with the second directory, wherein the second directory is associated with an auto quota, the auto quota including a quota and an exclude list;

determining whether a name of the subdirectory is in the exclude list, the exclude list comprising subdirectory names that are not subject to having the quota associated with the auto quota applied to them;

determining if any other quota has already been applied to the subdirectory, including any quota applied by the first directory; and only when the name of the subdirectory is not in the exclude list and no other quota has already been applied, applying the quota included in the auto quota to the subdirectory.

17. A system comprising:

a first directory including a subdirectory;

a second directory different from the first directory;

a processor; and a memory, the memory comprising computer-program instructions executable by the processor for performing a method comprising:

monitoring for an operation that associates the subdirectory with the second directory, wherein the second directory is associated with an auto quota, and wherein the auto quota includes a quota and an exclude list;

determining whether a name of the subdirectory is in the exclude list, the exclude list comprising subdirectory names that are not subject to having the quota associated with the auto quota applied to them;

determining if any other quota has already been applied to the subdirectory, including any quota applied by the first directory; and only when the name of the subdirectory is not in the exclude list and no other quota has already been applied, applying the quota included in the auto quota to the subdirectory.

* * * * *

UNITED STATES PATENT AND TRADEMARK OFFICE
CERTIFICATE OF CORRECTION

| | | |
|---|---|---|
| PATENT NO. | : 7,653,642 B2 | |
| APPLICATION NO. | : 11/000294 | |
| DATED | : January 26, 2010 | |
| INVENTOR(S) | : Ravinder S. Thind et al. | |

It is certified that error appears in the above-identified patent and that said Letters Patent is hereby corrected as shown below:

In column 1, line 24, above "Briefly, the present invention provides a method and" insert
-- SUMMARY --.

Signed and Sealed this
Eighth Day of February, 2011

David J. Kappos
*Director of the United States Patent and Trademark Office*